UNITED STATES PATENT OFFICE.

ALBERT HEMPEL, OF LEIPZIG-OETZSCH, GERMANY.

MEDICINAL BATH.

1,022,627.  Specification of Letters Patent.  Patented Apr. 9, 1912.

No Drawing.   Application filed December 6, 1909.   Serial No. 531,635.

*To all whom it may concern:*

Be it known that I, ALBERT HEMPEL, a citizen of Germany, residing at Leipzig-Oetzsch, Germany, have invented certain new and useful Improvements in Medicinal Baths, of which the following is a specification.

My invention relates to medicinal baths and has for its object to provide means whereby a bath of this kind can be effectively prepared and administered.

According to my invention a material which is highly absorbent, and capable of yielding a pulp with liquids, such as the various forms of cellulose, vegetable fibers, cotton wool, etc., is impregnated with materials which have curative properties. Thus there may be incorporated with the pulp-forming materials ingredients which upon the addition of water will liberate gases, such as carbon dioxid ($CO_2$) sulfur dioxid ($SO_2$), sulfureted hydrogen ($H_2S$), or oxygen ($O_2$). Other materials such as sea water salts, pine needle or malt extracts, or ingredients which will liberate iodin and bromin, and in general all recognized curative agents, may also be used.

The various ingredients may be incorporated with the pulp-forming material in any desired manner either in a dry or wet condition, pressure being used if necessary. The impregnated pulp-forming materials and then dried, *in vacuo* if necessary, and formed into pieces of any desired size and shape.

When the medicated pulp-forming material is added to a proper amount of water, a pulp-like mass is formed, which in addition to its medicinal qualities has the advantage that it will retain the temperature desired, within permissible limits, for a very much longer period of time than is possible without the use of such pulp-forming materials, so that there is no cooling off of the bath during the time which it is usually desirable for such baths to continue. Further the ethereal odors, and in particular the gases generated, such as $CO_2$, $SO_2$, $H_2S$, and $O_2$ are prevented from escaping through the pulp-like mass. Owing to the greater consistence given to the bath by the pulp-forming material a surface application by rubbing or massage is effected with particular advantage, thus largely enhancing the curative effect.

The pulp-forming material such as cellulose can be rendered entirely clean and wholesome, and is always of a homogeneous and known composition which is a feature of much value in the treatment of many diseases. The cellulose material moreover is chemically inert and has no reaction with the various materials which are incorporated with it.

The following examples will illustrate the manner of applying my invention:

Example 1: Oxygen baths may be obtained by adding to the cellulose bath such materials as will liberate oxygen, for example sodium perborate.

Example 2: The tablets to prepare a carbonic acid bath are of two kinds, one consisting of a cellulose tablet impregnated with an alkaline material such as sodium bicarbonate, and the other with an acid material such as sodium bisulfate. The tablets, which must contain about 1000 grams of bicarbonate and weigh about 4 kilos, are first added to the water. As soon as the tablet has broken up and the bicarbonate dissolved, a second cellulose tablet containing about 1000 grams of bisulfate of soda is added.

A suitable cellulose material is chemically prepared wood pulp, for example pulp from paper works, which is capable of forming a mat-like or felt-like substance or jelly that will neither settle to the bottom of the bath nor break up into separate portions. This layer of cellulose materials retains its high temperature for a long time and will therefore keep the bath at a uniform temperature for hours at a time. The cellulose felt and the bathing water are thoroughly saturated with the gas or other ingredients, the whole forming a voluminous jelly-like cover which prevents the escape of gas and heat, so that practically the entire amount of gas developed has a chance to do its maximum amount of work.

What I claim is:

1. A medicinal bath, consisting of water having in suspension therein a covering layer of cellulose, said bath having also therein a medicament.

2. A medicinal bath, consisting of water having in suspension therein a covering layer of cellulose, said bath having also therein a gaseous medicament, the escape of the gases being retarded by the covering layer of cellulose material.

3. The process of forming a medicinal bath, which consists in adding to water sufficient cellulose materials to form a heat- and gas-retaining layer thereover, such cellulose being impregnated with materials which upon access of water thereto will produce a gas.

In testimony whereof, I affix my signature in presence of two witnesses.

ALBERT HEMPEL.

Witnesses:
RUDOLPH FRICKE,
GEORG SIEGERT.